(12) United States Patent
Daniel (10) Patent No.: US 8,919,738 B2
(45) Date of Patent: Dec. 30, 2014

(54) LANDING GEAR CONTROL SYSTEM FOR TRAILERS

(76) Inventor: Jeffrey K. Daniel, Houston, TX (US)

( * ) Notice: Subject to any disclaimer, the term of this patent is extended or adjusted under 35 U.S.C. 154(b) by 378 days.

(21) Appl. No.: 13/523,667

(22) Filed: Jun. 14, 2012

(65) Prior Publication Data

US 2013/0334480 A1 Dec. 19, 2013

(51) Int. Cl.
*B60S 9/02* (2006.01)

(52) U.S. Cl.
USPC .......................................... 254/419; 254/418

(58) Field of Classification Search
USPC .................................................. 254/418, 419
See application file for complete search history.

(56) References Cited

U.S. PATENT DOCUMENTS

| | | | | |
|---|---|---|---|---|
| 4,318,550 | A * | 3/1982 | Jacobsen | 280/766.1 |
| 6,623,035 | B1 * | 9/2003 | Schneider | 280/766.1 |
| 2003/0127144 | A1 | 7/2003 | Seyfarth | |
| 2009/0008917 | A1 | 1/2009 | Daniel | |

FOREIGN PATENT DOCUMENTS

DE 102010037707 3/2012

OTHER PUBLICATIONS

PCT International Search Report and Written Opinion; mailing date, Nov. 29, 2013; 9 pages; PCT/US2013/045942, International Search Authority, United States of America.

* cited by examiner

*Primary Examiner* — Lee D Wilson
*Assistant Examiner* — Shantese McDonald (57) ABSTRACT

A landing gear system for a trailer is described. The landing gear system includes two jacks, each with a first tubular body in which a second tubular body is telescopically mounted, a hydraulic chamber and a pneumatic chamber. The system includes a hydraulic fluid reservoir, a pneumatic fluid source, a pneumatic manifold in pneumatic fluid communication with the pneumatic source and in pneumatic fluid communication with said hydraulic reservoir and a hydraulic manifold in hydraulic fluid communication with the hydraulic reservoir. Pneumatically operated hydraulic pumps are included, along with a central control mechanism attached to the pneumatic manifold and disposed to simultaneously control pneumatic flow into the pneumatic chambers of the jacks and to pneumatically operated hydraulic pumps. Separate pneumatically operated hydraulic valve are provided to individually control hydraulic flow from the jacks.

25 Claims, 4 Drawing Sheets

LANDING GEAR CONTROL SYSTEM FOR TRAILERS

BACKGROUND OF THE INVENTION

1. Field of the Invention

The present invention relates to semi-trailer landing gear extension and retraction mechanisms, and more particularly to a pneumatic and hydraulic control mechanism that promotes coordinated extension and retraction of landing gear legs.

2. Description of the Prior Art

Many semi-trailers have front landing gear for support of the front of the trailer when the tractor is detached. Such landing gear generally has two spaced-apart, telescoping or Jack-type landing gear legs which extend downwardly from the bed of the trailer.

Traditionally, each leg is operatively attached to a screw and follower or a rack and pinion gear arrangement which is driven by a landing gear drive shaft extending between the legs. The drive shaft controls extension or retraction of the legs depending on the direction in which it is rotated. Most commonly, a hand operable crank is attached to the landing gear drive shaft. Manual rotation of the crank via a crank handle causes extension and retraction of the landing gear. Manually operated jack structures, however, are often difficult to use, require much time for their operation and expose the operator to potential injuries as he is positioned next to the trailer while turning the crank to raise or lower the landing gear.

More recently, landing gear systems have been provided with powered devices in order to raise and lower the landing gear. Some of these powered devices have been pneumatically powered. Typically, such pneumatic devices require a complex control and piping system to receive pressurized air for the motion actuators to rotate the crank shaft of the gear reduction assembly to raise and lower the landing gear. One class of prior art pneumatic devices has utilized pneumatic impact motors to drive the landing gear. Of course, those skilled in the art will understand that due to their pulsating drive mechanism, such pneumatic impact motors are not conducive to the desired smooth operation of raising and lowering the landing gear legs, especially in combination with gear reduction boxes.

Another class of prior art pneumatic mechanisms dispenses with the gearing system of traditional landing gear and utilizes a pneumatic bladder or chamber within each leg to telescope the landing gear.

Piston driven hydraulic landing gear devices are also known in the prior art. Similar to the pneumatic air bladder/chamber system referenced above, such devices replace traditional drive shaft/gearing systems and utilize hydraulic pistons to drive the landing gear. One drawback to hydraulic pistons is that they do not provide the same positive holding as provided by a gearing arrangement. Power failure or loss of fluid pressure could cause failure and collapse of the landing gear. As with the pneumatic systems, typically, such hydraulic devices require a complex control and piping system.

Moreover, with respect to either pneumatic or hydraulic bladder/chamber systems, it has been found that it is desirable to utilize two smaller pumps to provide pressurized fluid for actuation of the system. In the prior art, such pumps are typically located adjacent their respective jacks to pump hydraulic fluid from a reservoir located adjacent the jack to a chamber within the telescoping leg of the jack, and, as mentioned above, require complex control and piping systems. It has been found that such systems, in particular those requiring a significant amount of piping, couplings and the like, are readily subject to wear and/or damage by virtue of the operating environment to which they are exposed, i.e., high vibration, exposure to road debris, etc. Moreover, such systems have individual controls for the respective jacks. Such a control system promotes damage to the system and trailer frame, when the jacks are not correctly synchronized during raising and lowering, thereby causing twisting of the trailer frame.

In addition, such systems are generally large, cumbersome and permanently installed as an integrated part of the drive system, and do not lend themselves to retrofitting on trailers have pre-existing landing gear.

SUMMARY OF THE INVENTION

The present invention provides a landing gear system whereby telescoping jacks of the landing gear are driven by both hydraulic and pneumatic fluids, the flow of which is controlled by centrally located pumps, a centrally located pneumatic manifold, a centrally located hydraulic manifold and, preferably, a single control mechanism. The system utilizes a single oil reservoir that is also located adjacent the manifolds and pumps.

The system eliminates much of the piping and couplings of the prior art. Moreover, the system inhibits operator induced twisting of the trailer frame due to uneven raising and lowering of the two jack legs. Finally, the system is more readily retrofitted for use on existing trailers because of the centrally located pump, manifold and control system.

DESCRIPTION OF THE PREFERRED EMBODIMENTS

Figure 1A:
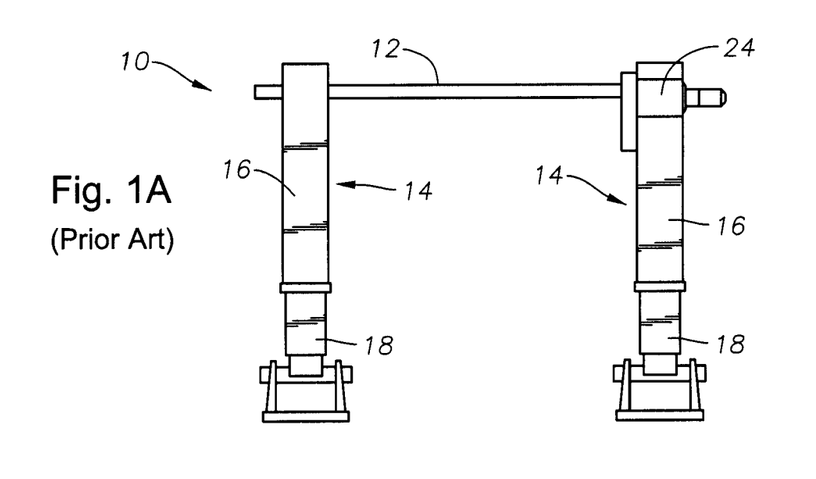
FIG. 1a illustrates a typical set of prior art landing gear for a semi-trailer which landing gear is driven by a drive shaft and a gearbox.

FIG. 1a depicts a conventional drive-shaft driven landing gear assembly 10 of the prior art. As can be seen in the view of FIG. 1a, the landing gear 10 has a drive shaft 12 which passes through the upper ends of a pair of telescoping legs 14. Each leg 14 has an outer tubular body 16 in which an inner tubular portion 18 is telescopically received. Pivotally mounted feet, wheels or pads 20 attach to the distal end of each inner tubular portion 18. Conventional gear mechanisms (not shown) within outer tubular body 16 cause the inner tubular portion 18 to raise or lower, depending upon the direction of rotation of the drive shaft 12. A gear reduction box 24 may also be provided to assist in transfer of power to the drive shaft 12.

Figure 1B:
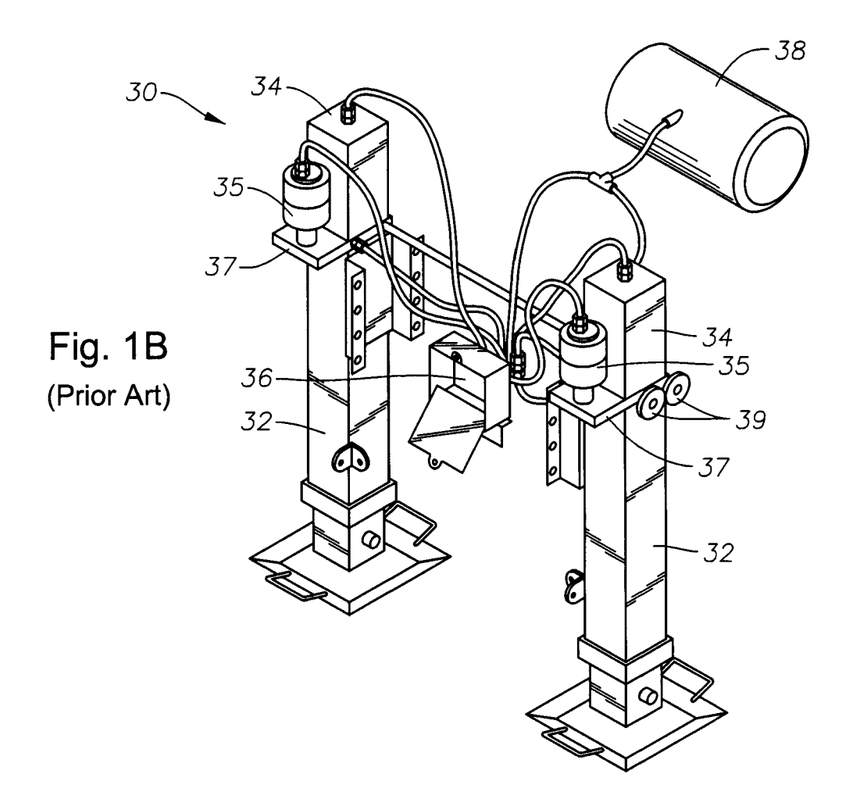
FIG. 1b illustrates a set of prior art landing gear for a semi-trailer which landing gear is driven by hydraulic reservoirs and pumps positioned on the respective jacks.

FIG. 1b depicts a hydraulically driven landing gear assembly 30 of the prior art. As can be seen in the view of FIG. 1b, the landing gear 30 includes a pair of telescoping legs 32, each of which has a hydraulic reservoir 34 disposed on top of its respective leg 32. Each leg 32 is further provided with a pneumatically driven oil pump 35 adjacent the oil reservoir 34 and an oil manifold disposed 37 on the leg 32 to supply oil to its respective leg 32. Each leg 32 has a respective toggle switch 36 to released compressed air to the pump 35, the reservoir 34 and internally to leg 32 from an air reservoir 38. Finally, each leg includes manual knob valves 39 to permit flow from the respective legs 32 back into the respective oil reservoirs 34.

Figure 2:
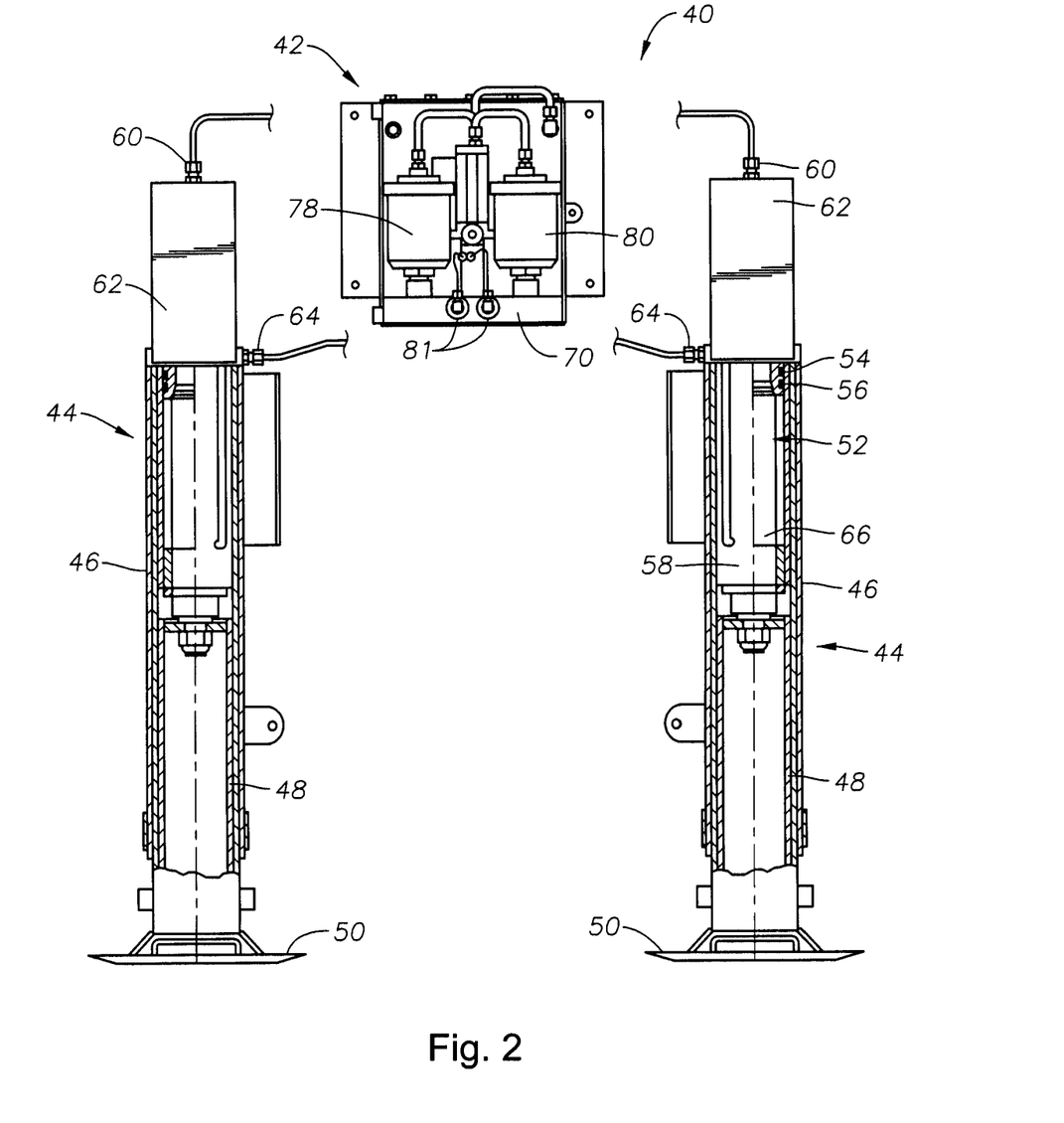
FIG. 2 is a partial cut-away view of the landing gear system of the invention.

With reference to FIG. 2, a landing gear system 40 of the invention is shown. Generally, landing gear system 40 includes a central control module 42 and a pair of telescoping legs 44. Each telescoping leg generally comprises an outer tubular member 46 with an inner tubular member 48 slidingly disposed therein. Each inner tubular member 48 may include a foot 50.

Each leg 44 also includes a piston 52, hydraulic gaskets 54, pneumatic gaskets 56, a piston rod or plunger 58, a hydraulic fluid port 60, a hydraulic fluid chamber 62, a pneumatic fluid port 64 and a pneumatic fluid chamber 66. The hydraulic fluid port 60 is in fluid communication with the hydraulic fluid chamber 62 which is in fluid communication with the upper pressure surface of piston 52. The pneumatic fluid port 64 is in fluid communication with the pneumatic fluid chamber 66 which is in fluid communication with the lower pressure surface of piston 52. Piston rod 58 is attached to the proximal end of inner tubular member 46, and piston 52 is axially movable within tube 46 to extend or retract piston rod 58 (and hence, tube 48) under pressure applied to the respective upper and lower pressure surfaces of piston 52. Hydraulic fluid port 60 may include a flow control or check valve to restrict flow of hydraulic fluid from chamber 62 back into hydraulic reservoir 82.

Figure 3:
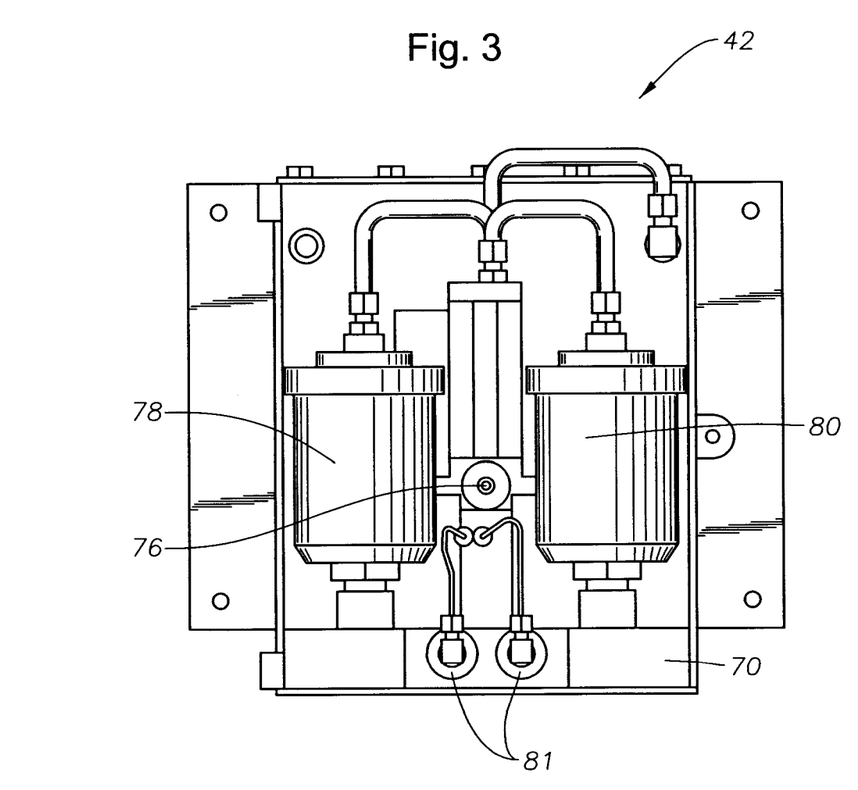
FIG. 3 is a front view of the control mechanism of the invention.
Figure 4:
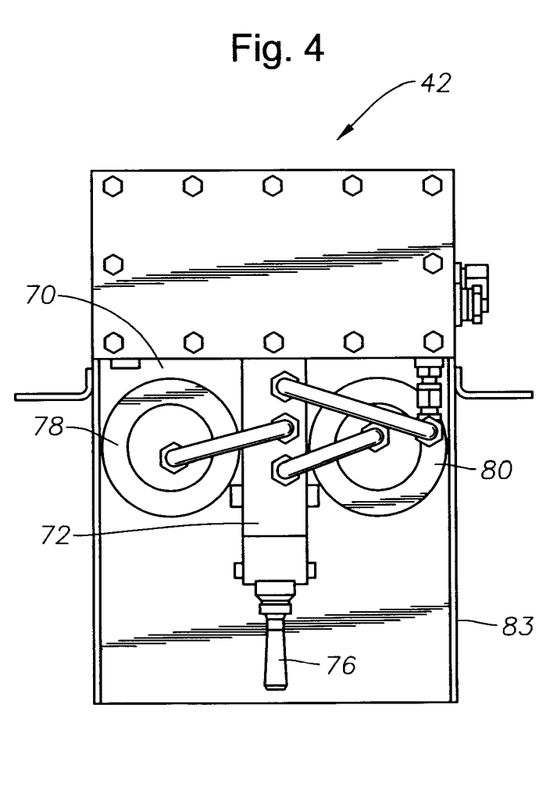
FIG. 4 is a top view of the control mechanism of the invention.
Figure 5:
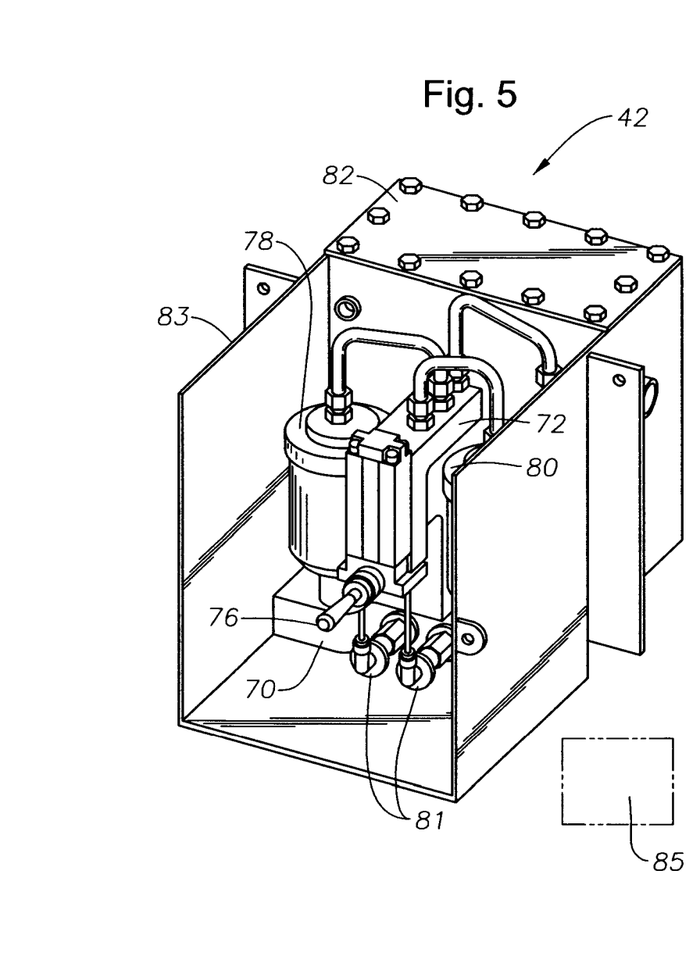
FIG. 5 is a perspective view of the control mechanism of the invention.

With reference to FIGS. 3-5, control module 42 generally comprises a hydraulic manifold 70, a pneumatic manifold 72, a central control mechanism 76 and pneumatically controlled hydraulic pumps or intensifiers 78, 80. In certain preferred embodiments, control module 42 also comprises air operated oil control valves 81. Control module 42 is preferably disposed in an enclosure 83 to protect the components of control module 42 from the environment.

A hydraulic reservoir 82, containing a hydraulic fluid, is positioned adjacent control module 42 and is in fluid communication with hydraulic manifold 70. In one embodiment, the hydraulic fluid is oil.

Likewise, a pneumatic source 85 is in fluid communication (not shown) with pneumatic manifold 72. In one embodiment, pneumatic source 85 is a compressed air reservoir. In another embodiment, pneumatic source 85 is an air compressor.

Figure 6:
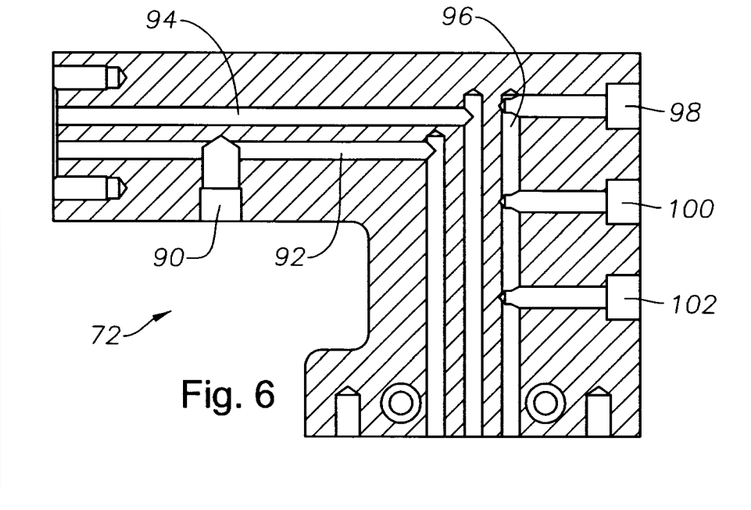
FIG. 6 is a cut-away side view of one embodiment of the pneumatic manifold of the invention.

Referring to FIG. 6, pneumatic manifold 72 is provided with an air supply inlet 90 in fluid communication with a first internal passage 92. Manifold 72 is further provided with a second internal passage 94 and a third internal passage 96. Central control mechanism 76 (shown in FIGS. 3-5) is operable to selectively fluidly connect either second internal passage 94 or third internal passage 96 with first internal passage 92 to supply pneumatic fluid thereto. In one embodiment, central control mechanism 76 is a self-centering switch, such as a spring centered joy stick, that has a first position, a second neutral position and a third position. Those skilled in the art will understand that such a self-centering joy stick is disposed to return to the second neutral position when not under a force urging the lever to the first or third positions. Moreover, in the neutral position, neither the second internal passage 94 nor the third internal passage 96 is fluidly connected to the first internal passage 92.

In the first position, central control mechanism 76 fluidly couples first internal passage 92 to third internal passage 96 in order to extend both tubes 48. In the third position, central control mechanism 76 fluidly couples first internal passage 92 to second internal passage 94 in order to retract both tubes 48. As discussed above, central control mechanism 76 controls the extension or retraction of both tubes 48 in a synchronized manner so as to avoid frame twisting.

Third internal passage 96 is likewise in fluid communication with a first pneumatic outlet 98, a second pneumatic outlet 100 and a third pneumatic outlet 102.

Referring back to FIGS. 3-5, first pneumatic outlet 98 is in fluid communication with hydraulic reservoir 82 to provide head pressure to hydraulic fluid disposed therein. Second pneumatic outlet 100 is in fluid communication with the oil pump 78 and is disposed to supply a pneumatic working fluid thereto in order to drive pump 78. Likewise, third pneumatic outlet 102 is in fluid communication with oil pump 80 and is disposed to supply a pneumatic working fluid thereto in order to drive pump 80.

Figure 7:
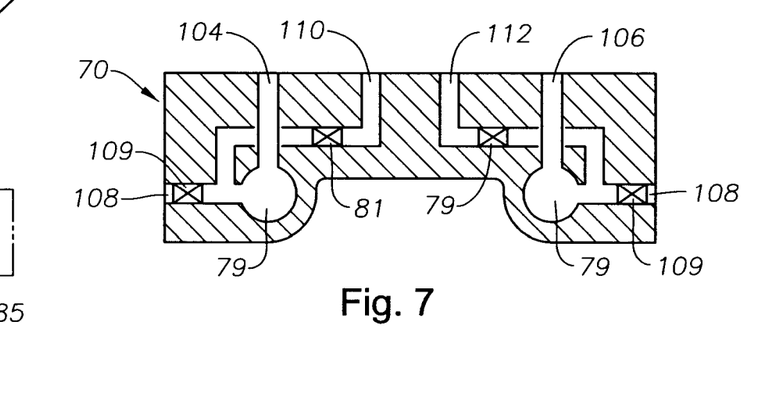
FIG. 7 is a cut-away top view of one embodiment of the hydraulic manifold of the invention.

With reference to FIG. 7, hydraulic manifold 70 includes a first internal passage 104 in fluid communication with hydraulic source 82 and a second internal passage 106 in fluid communication with hydraulic source 82. Each of the first internal passages 104, 106 is in fluid communication with a hydraulic fluid port 108. Each manifold hydraulic fluid port 108 is in fluid communication with the hydraulic fluid port 60 of one of the hydraulic chambers 62.

Each hydraulic pump 78, 80 is mounted on the hydraulic manifold 70 at 79 and is disposed to pump hydraulic fluid from hydraulic reservoir 82 via passage 104, 106 to hydraulic chamber 62 via ports 108 so as to provide a head pressure to the hydraulic chamber 62. Each hydraulic port 108 may include a check valve 109 to control hydraulic flow therethrough.

Preferably, hydraulic reservoir 82 is in direct fluid communication with hydraulic manifold 70 so as to obviate the need for external piping between manifold 70 and reservoir 82.

Hydraulic manifold 70 may further include a third passage 110 and a forth passage 112, each of which receives an air operated oil control valve 81 to control the flow of hydraulic fluid therethrough. Although it is desirable to raise legs 48 in a synchronized manner utilizing central control mechanism 76, those skilled in the art will appreciate that hydraulic legs tend to wear at different rates. A central control mechanism 76 that operates to retract both legs 48 simultaneously may result in twisting of the trailer frame. As such, to the extent legs 48 are not synchronized in their retraction or are otherwise extended or aligned to different degrees, valves 81 may be utilized to override central control mechanism 76 so as to permit hydraulic fluid flow from only one hydraulic chamber 62 back into reservoir 82 as necessary to individually adjust the relative positions of the two legs 48 until their relative extended positions are the same (at which point, central control mechanism 76 may thereafter be utilized to continue retraction of both legs 48). In other words, air operated oil control valves 81 permit control of each leg 48 separately, while the particular aforementioned central control mechanism 76 permits control of each leg simultaneously.

In another embodiment of the invention, central control mechanism 76 has a forth and fifth position. In such an embodiment, central control mechanism 76 may replace air operated oil control valves 81. In the fifth position, central control mechanism 76 permits hydraulic fluid flow from only one hydraulic chamber 62 back into reservoir 82 as necessary to adjust the relative positions of the two legs 48 until their relative extended positions are the same. Likewise, in the sixth position, central control mechanism 76 permits hydraulic fluid flow from only the other hydraulic chamber 62 back into reservoir 82 as necessary to adjust the relative positions of the two legs 48 until their relative extended positions are the same.

Check valves, or similar one-way flow devices, may be utilized in one or both manifolds, as well as, or alternatively, in each jack or telescoping mechanism to ensure that fluid, particularly pressurized fluid, does not backflow through a particular fluid path.

In operation, to lower legs 44 by telescopingly extending tube 48 relative to tube 46, central control mechanism 76 is moved into the first position. In this first position, a pneumatic pressure head is applied, via first pneumatic outlet 98, to hydraulic fluid within reservoir 82, so as to cause the hydraulic fluid to quickly flood into chambers 62, applying pressure to piston 52 and thereby rapidly extending tubes 48 until they meet resistance, i.e., the ground. At this point, pumps 78, 80 continue to pump highly pressurized hydraulic fluid into chambers 62 so as to continue to extend tubes 48 against the load of the trailer. Once the legs 44 have been telescopically extended as desired, central control mechanism 76 may be released, at which point it will automatically come to rest in the second or neutral position.

To raise legs 44 by telescopingly retracting each tube 48 relative to tube 46, central control mechanism 76 is moved into the third position. In this third position, pneumatic fluid such as air is introduced into air chambers 66 via air inlets 64 of legs 44. The air pressure urges pistons 52 axially along tubes 46, thereby pushing the hydraulic fluid in chambers 62 back into hydraulic reservoir 82. To the extent legs 44 include hydraulic fluid flow control valves, the valves may be opened to allow the weight of the trailer to urge the hydraulic fluid of chambers 62 back into hydraulic reservoir 82 until the trailer rests on a support (such as a fifth wheel), at which point the pneumatic air within air chambers 66 will continue to cause the retraction of tubes 46.

To the extent legs 44 have worn at different rates resulting in their respective tubes 48 being extended to different degrees, air operated oil control valves 81 can be utilized to synchronize the two tubes 48.

Those persons of ordinary skill in the art will appreciate that while the foregoing invention has been described in the context of landing gear having two legs, it may also be utilized for single leg jacks or other telescoping mechanisms.

In one exemplary aspect, the present disclosure is directed to a landing gear system that includes a first jack comprising a first tubular body in which a second tubular body is telescopically mounted, a hydraulic chamber and a pneumatic chamber; a second jack comprising a first tubular body in which a second tubular body is telescopically mounted, a hydraulic chamber and a pneumatic chamber; a hydraulic fluid reservoir; a pneumatic fluid source; a pneumatic manifold in pneumatic fluid communication with the pneumatic source and in pneumatic fluid communication with said hydraulic reservoir; a hydraulic manifold in hydraulic fluid communication with the hydraulic reservoir; a first pneumatically operated hydraulic pump in pneumatic fluid communication with the pneumatic manifold and in hydraulic fluid communication with the hydraulic manifold; a second pneumatically operated hydraulic pump in pneumatic fluid communication with the pneumatic manifold and in hydraulic fluid communication with the hydraulic manifold; a central control mechanism attached to the pneumatic manifold and disposed to control pneumatic flow into the pneumatic chambers of the first and second jack, the first and second pneumatically operated hydraulic pump and the hydraulic reservoir; and a first pneumatically operated hydraulic valve separate from the central control mechanism, said first pneumatically operated hydraulic valve disposed to control hydraulic fluid flow from the hydraulic chamber of the first jack back into the hydraulic fluid reservoir.

In one exemplary aspect, the present disclosure is directed to a landing gear system for a trailer, the system including a first jack having a first tubular body in which a second tubular body is telescopically mounted, a hydraulic chamber and a pneumatic chamber; a second jack having a first tubular body in which a second tubular body is telescopically mounted, a hydraulic chamber and a pneumatic chamber; a hydraulic fluid reservoir; a pneumatic fluid source; a pneumatic manifold in pneumatic fluid communication with the pneumatic source and in pneumatic fluid communication with said hydraulic reservoir, said pneumatic manifold comprising first, second and third internal passages and an air supply inlet in fluid communication with a first internal passage; a hydraulic manifold in hydraulic fluid communication with the hydraulic reservoir, said hydraulic manifold comprising a first internal passage in fluid communication with the hydraulic reservoir, a second internal passage in fluid communication with hydraulic reservoir, a first port in fluid communication with the first internal passage and a second port in fluid communication with the second internal passage, wherein the first port of the hydraulic manifold is in fluid communication with the hydraulic chamber of the first jack and the second port of the hydraulic manifold is in fluid communication with the hydraulic chamber of the second jack; a first pneumatically operated hydraulic pump in pneumatic fluid communication with the pneumatic manifold and in hydraulic fluid communication with the hydraulic manifold; a second pneumatically operated hydraulic pump in pneumatic fluid communication with the pneumatic manifold and in hydraulic fluid communication with the hydraulic manifold; a central control mechanism attached to the pneumatic manifold and disposed to control pneumatic flow into the pneumatic chambers of the first and second jack, the first and second pneumatically operated hydraulic pump and the hydraulic reservoir, wherein the central control mechanism is a self-centering mechanism having a first position, a second position and a third position, wherein the central control mechanism is disposed to self-center to the second position, wherein the central control mechanism when in first position permits pneumatic fluid communication between first internal passage and third internal passage of the pneumatic manifold and when in the third position, permits pneumatic fluid communication between first internal passage and the second internal passage of the pneumatic manifold; and a first valve disposed to control hydraulic fluid flow from the hydraulic chamber of the first jack back into the hydraulic fluid reservoir and a second valve disposed to control hydraulic fluid flow from the hydraulic chamber of the second jack back into the hydraulic fluid reservoir.

In one exemplary aspect, the present disclosure is directed to a method of operating the landing gear of a trailer, the landing gear having a first and second jacks, each with a first tubular body in which a second tubular body is telescopically mounted, a hydraulic chamber and a pneumatic chamber. The method includes the steps of providing a pneumatic manifold having a plurality of internal passages defined therein; providing a hydraulic manifold having a plurality of internal passages defined therein; providing a single central control mechanism disposed to control pneumatic fluid flow through the pneumatic manifold; moving the central control mechanism to a first position, thereby causing hydraulic fluid to flow from a central hydraulic reservoir through the hydraulic manifold to the hydraulic chambers of the two jacks under a pneumatic head pressure generated within hydraulic reservoir from the pneumatic manifold; continuing to maintain the central control mechanism in the first position to activate hydraulic pumps so as to pump hydraulic fluid from the central hydraulic reservoir through the hydraulic manifold to the hydraulic chambers of the two jacks, thereby telescopically extending the second tubular body of each jack from the first tubular body of each jack; allowing the central control mechanism to self-center to a second position whereby pneumatic flow through the pneumatic manifold is inhibited; moving the central control mechanism to a third position thereby causing hydraulic fluid to flow from the hydraulic chambers of the two jacks, through the hydraulic manifold to the central hydraulic reservoir; and continuing to maintain the central control mechanism in the third position to supply pneumatic fluid flow from the a central pneumatic supply source through the pneumatic manifold to the pneumatic chambers of the two jacks, thereby retracting the second tubular body of each jack within the first tubular body of each jack. The method may further include the steps of providing first and second valves within the hydraulic manifold to control hydraulic fluid flow through the manifold back into the hydraulic reservoir; and actuating one or the other of the first and second valves in order to adjust the relative positions of the second tubular bodies.

In one exemplary aspect, the present disclosure is directed to a telescoping extension system having a first telescoping mechanism including a first telescoping mechanism with a first member slidingly disposed relative to a second member, a hydraulic chamber adjacent the sliding member and a pneumatic chamber adjacent the sliding member; a second telescoping mechanism having a first member slidingly disposed relative to a second member, a hydraulic chamber adjacent the sliding member and a pneumatic chamber adjacent the sliding member; a hydraulic fluid reservoir; a pneumatic fluid source; a pneumatic manifold in pneumatic fluid communication with the pneumatic source and in pneumatic fluid communication with said hydraulic reservoir; a hydraulic manifold in hydraulic fluid communication with the hydraulic reservoir; a first pneumatically operated hydraulic pump in pneumatic fluid communication with the pneumatic manifold and in hydraulic fluid communication with the hydraulic manifold; a second pneumatically operated hydraulic pump in pneumatic fluid communication with the pneumatic manifold and in hydraulic fluid communication with the hydraulic manifold; a central control mechanism attached to the pneumatic manifold and disposed to control pneumatic flow into the pneumatic chambers of the first and second telescoping mechanisms, the first and second pneumatically operated hydraulic pump and the hydraulic reservoir; and a first pneumatically operated hydraulic valve, separate from the central control mechanism, said first pneumatically operated hydraulic valve disposed to control hydraulic fluid flow from the hydraulic chamber of the first telescoping mechanism back into the hydraulic fluid reservoir.

The foregoing eliminates many of the leak points of the prior art systems, and also diminishes the likelihood of damage to the system from the operating environment or vibrations from operation of the tractor trailer. The system requires only a single hydraulic manifold and a single pneumatic manifold, thereby simplifying manufacture and maintenance of the system. In addition, by removing control mechanism and oil reservoir from the legs themselves, such a system will more readily permit the system to be retrofitted on existing trailers.

Although various embodiments and methodologies have been shown and described, the invention is not limited to such embodiments and methodologies and will be understood to include all modifications and variations as would be apparent to one skilled in the art. Therefore, it should be understood that the invention is not intended to be limited to the particular forms disclosed. Rather, the intention is to cover all modifications, equivalents and alternatives falling within the spirit and scope of the invention as defined by the appended claims.

What is claimed is:

1. A landing gear system for a trailer, said system comprising:
   a. a first jack, said first jack comprising a first tubular body in which a second tubular body is telescopically mounted, a hydraulic chamber and a pneumatic chamber;
   b. a second jack, said second jack comprising a first tubular body in which a second tubular body is telescopically mounted, a hydraulic chamber and a pneumatic chamber;
   c. a hydraulic fluid reservoir;
   d. a pneumatic fluid source;
   e. a pneumatic manifold in pneumatic fluid communication with the pneumatic source and in pneumatic fluid communication with said hydraulic reservoir;
   f. a hydraulic manifold in hydraulic fluid communication with the hydraulic reservoir;
   g. a first pneumatically operated hydraulic pump in pneumatic fluid communication with the pneumatic manifold and in hydraulic fluid communication with the hydraulic manifold;
   h. a second pneumatically operated hydraulic pump in pneumatic fluid communication with the pneumatic manifold and in hydraulic fluid communication with the hydraulic manifold;
   g. a central control mechanism attached to the pneumatic manifold and disposed to control pneumatic flow into the pneumatic chambers of the first and second jack, the first and second pneumatically operated hydraulic pump and the hydraulic reservoir; and
   h. a first pneumatically operated hydraulic valve separate from the central control mechanism, said first pneumatically operated hydraulic valve disposed to control hydraulic fluid flow from the hydraulic chamber of the first jack back into the hydraulic fluid reservoir.

2. The landing gear system of claim of 1, further comprising a second pneumatically operated hydraulic valve disposed to control hydraulic fluid flow from the hydraulic chamber of the second jack back into the hydraulic fluid reservoir.

3. The landing gear system of claim 2, wherein the first and second valves are mounted on the hydraulic manifold and each control hydraulic fluid flow from their respective jacks through the manifold.

4. The landing gear system of claim 3, wherein the first and second valves are air operated valves.

5. The landing gear system of claim 1, wherein central control mechanism is a self-centering mechanism having a first position, a second position and a third position, wherein the central control mechanism is disposed to self-center to the second position.

6. The landing gear system of claim 5, wherein the central control mechanism when in first position permits pneumatic fluid communication between first internal passage and third internal passage and when in the third position, permits pneumatic fluid communication between first internal passage and the second internal passage.

7. The landing gear system of claim 5, wherein the central control mechanism has a fifth position and a sixth position.

8. The landing gear system of claim 7, wherein the central control mechanism when in the fifth position permits hydraulic fluid communication between the hydraulic chamber of the first jack and the hydraulic reservoir and when in the sixth position, permits hydraulic fluid communication between the hydraulic chamber of the second jack and the hydraulic reservoir.

9. The landing gear system of claim 1, further comprising a check valve disposed in each of the hydraulic chambers of the jacks.

10. The landing gear system of claim 1, wherein said pneumatic manifold comprises first, second and third internal passages and an air supply inlet in fluid communication with a first internal passage.

11. The landing gear of claim 10, wherein said central control mechanism is operable to selectively fluidly connect either the second internal passage or third internal passage with first internal passage.

12. The landing gear of claim 11, said pneumatic manifold further comprising a first pneumatic outlet, a second pneumatic outlet, and a third pneumatic outlet each in fluid communication with the third internal passage.

13. The landing gear of claim 12, wherein said first pneumatic outlet is in pneumatic fluid communication with hydraulic reservoir, said second pneumatic outlet is in pneumatic fluid communication with the first pump and the third pneumatic outlet is in pneumatic fluid communication with the second pump.

14. The landing gear system of claim 1, wherein said hydraulic manifold comprises a first internal passage in fluid communication with the hydraulic reservoir, a second internal passage in fluid communication with hydraulic reservoir, a first port in fluid communication with the first internal passage and a second port in fluid communication with the second internal passage.

15. The landing gear system of claim 14, wherein the first port of the hydraulic manifold is in fluid communication with the hydraulic chamber of the first jack and the second port of the hydraulic manifold is in fluid communication with the hydraulic chamber of the second jack.

16. The landing gear system of claim 1, wherein said hydraulic manifold is mounted to said hydraulic reservoir.

17. The landing gear system of claim 1, wherein said pneumatic manifold is mounted on said hydraulic manifold.

18. The landing gear system of claim 1, wherein said first and second pneumatically operated hydraulic pumps are mounted on said hydraulic manifold.

19. A landing gear system for a trailer, said system comprising:
   a. a first jack, said first jack comprising a first tubular body in which a second tubular body is telescopically mounted, a hydraulic chamber and a pneumatic chamber;
   b. a second jack, said second jack comprising a first tubular body in which a second tubular body is telescopically mounted, a hydraulic chamber and a pneumatic chamber;
   c. a hydraulic fluid reservoir;
   d. a pneumatic fluid source;
   e. a pneumatic manifold in pneumatic fluid communication with the pneumatic source and in pneumatic fluid communication with said hydraulic reservoir, said pneumatic manifold comprising first, second and third internal passages and an air supply inlet in fluid communication with a first internal passage;
   f. a hydraulic manifold in hydraulic fluid communication with the hydraulic reservoir, said hydraulic manifold comprising a first internal passage in fluid communication with the hydraulic reservoir, a second internal passage in fluid communication with hydraulic reservoir, a first port in fluid communication with the first internal passage and a second port in fluid communication with the second internal passage, wherein the first port of the hydraulic manifold is in fluid communication with the hydraulic chamber of the first jack and the second port of the hydraulic manifold is in fluid communication with the hydraulic chamber of the second jack;
   g. a first pneumatically operated hydraulic pump in pneumatic fluid communication with the pneumatic manifold and in hydraulic fluid communication with the hydraulic manifold;
   h. a second pneumatically operated hydraulic pump in pneumatic fluid communication with the pneumatic manifold and in hydraulic fluid communication with the hydraulic manifold;
   i. a central control mechanism attached to the pneumatic manifold and disposed to control pneumatic flow into the pneumatic chambers of the first and second jack, the first and second pneumatically operated hydraulic pump and the hydraulic reservoir, wherein the central control mechanism is a self-centering mechanism having a first position, a second position and a third position, wherein the central control mechanism is disposed to self-center to the second position, wherein the central control mechanism when in first position permits pneumatic fluid communication between first internal passage and third internal passage of the pneumatic manifold and when in the third position, permits pneumatic fluid communication between first internal passage and the second internal passage of the pneumatic manifold; and
   j. a first valve disposed to control hydraulic fluid flow from the hydraulic chamber of the first jack back into the hydraulic fluid reservoir and a second valve disposed to control hydraulic fluid flow from the hydraulic chamber of the second jack back into the hydraulic fluid reservoir.

20. The landing gear system of claim of 19, wherein the first and second valves are mounted on the hydraulic manifold and each control hydraulic fluid flow from their respective jacks through the manifold.

21. The landing gear system of claim 20, wherein the first and second valves are air operated valves.

22. The landing gear system of claim 20, further comprising a check valve disposed in each of the hydraulic chambers of the jacks.

23. A method of operating the landing gear of a trailer, the landing gear having a first and second jacks, each with a first tubular body in which a second tubular body is telescopically mounted, a hydraulic chamber and a pneumatic chamber, said method comprising:
   providing a pneumatic manifold having a plurality of internal passages defined therein;
   providing a hydraulic manifold having a plurality of internal passages defined therein;
   providing a single central control mechanism disposed to control pneumatic fluid flow through the pneumatic manifold;
   moving the central control mechanism to a first position, thereby causing hydraulic fluid to flow from a central hydraulic reservoir through the hydraulic manifold to the hydraulic chambers of the two jacks under a pneumatic head pressure generated within hydraulic reservoir from the pneumatic manifold;

continuing to maintain the central control mechanism in the first position to activate hydraulic pumps so as to pump hydraulic fluid from the central hydraulic reservoir through the hydraulic manifold to the hydraulic chambers of the two jacks, thereby telescopically extending the second tubular body of each jack from the first tubular body of each jack;

allowing the central control mechanism to self-center to a second position whereby pneumatic flow through the pneumatic manifold is inhibited;

moving the central control mechanism to a third position thereby causing hydraulic fluid to flow from the hydraulic chambers of the two jacks, through the hydraulic manifold to the central hydraulic reservoir; and continuing to maintain the central control mechanism in the third position to supply pneumatic fluid flow from the a central pneumatic supply source through the pneumatic manifold to the pneumatic chambers of the two jacks, thereby retracting the second tubular body of each jack within the first tubular body of each jack.

24. The method of claim 23, further comprising the steps of providing first and second valves within the hydraulic manifold to control hydraulic fluid flow through the manifold back into the hydraulic reservoir; and actuating one or the other of the first and second valves in order to adjust the relative positions of the second tubular bodies.

25. A telescoping extension system, said system comprising:
a. a first telescoping mechanism, said first telescoping mechanism comprising a first member slidingly disposed relative to a second member, a hydraulic chamber adjacent the sliding member and a pneumatic chamber adjacent the sliding member;
b. a second telescoping mechanism, said second telescoping mechanism comprising a first member slidingly disposed relative to a second member, a hydraulic chamber adjacent the sliding member and a pneumatic chamber adjacent the sliding member;
c. a hydraulic fluid reservoir;
d. a pneumatic fluid source;
e. a pneumatic manifold in pneumatic fluid communication with the pneumatic source and in pneumatic fluid communication with said hydraulic reservoir;
f. a hydraulic manifold in hydraulic fluid communication with the hydraulic reservoir;
g. a first pneumatically operated hydraulic pump in pneumatic fluid communication with the pneumatic manifold and in hydraulic fluid communication with the hydraulic manifold;
h. a second pneumatically operated hydraulic pump in pneumatic fluid communication with the pneumatic manifold and in hydraulic fluid communication with the hydraulic manifold;
i. a central control mechanism attached to the pneumatic manifold and disposed to control pneumatic flow into the pneumatic chambers of the first and second telescoping mechanisms, the first and second pneumatically operated hydraulic pump and the hydraulic reservoir; and
j. a first pneumatically operated hydraulic valve, separate from the central control mechanism, said first pneumatically operated hydraulic valve disposed to control hydraulic fluid flow from the hydraulic chamber of the first telescoping mechanism back into the hydraulic fluid reservoir.

* * * * *